United States Patent [19]

Wilson et al.

[11] Patent Number: 4,664,287
[45] Date of Patent: May 12, 1987

[54] VENT FOR AN ELECTROCHEMICAL CELL

[75] Inventors: John A. Wilson, Cockeysville; Robert J. Staniewicz, Baltimore, both of Md.; Bruce Webber, Naperville, Ill.; George W. Allvey, Beaconsfield, Canada

[73] Assignee: Saft America, Inc., Valdosta, Ga.

[21] Appl. No.: 839,362

[22] Filed: Mar. 10, 1986

[51] Int. Cl.4 .............................................. B65D 90/34
[52] U.S. Cl. ........................... 220/89 A; 220/DIG. 27
[58] Field of Search .................... 220/89 A, 361, 367, 220/DIG. 27, 254, 257, 265, 303, 363, 364; 383/100, 103; 229/DIG. 14

[56] References Cited

U.S. PATENT DOCUMENTS

| 2,163,262 | 6/1939 | Rhodes | 220/DIG. 27 X |
|---|---|---|---|
| 2,322,210 | 6/1943 | Adams | 220/DIG. 27 X |
| 2,326,771 | 8/1943 | Eidson | 220/89 A X |
| 2,632,784 | 3/1953 | Marsal et al. | 220/DIG. 27 X |
| 3,463,351 | 8/1969 | Mills | 220/89 A |
| 3,585,082 | 6/1971 | Siller | 220/367 X |
| 3,658,206 | 4/1972 | Barbier | 220/89 A |
| 4,413,746 | 11/1983 | Matsutani | 220/89 A |

Primary Examiner—Steven M. Polland
Attorney, Agent, or Firm—Cushman, Darby & Cushman

[57] ABSTRACT

A pressure relief vent on a container includes a flat diaphragm fastened to the exterior of a container so as to cover an opening in the container. The diaphragm is fastened to the container at its perimeter and at at least one point within its perimeter. The shape of the peripheral fastening seam and the number of and size of the point fastenings determine and stabilize the vent pressure at which the diaphragm ruptures.

14 Claims, 9 Drawing Figures

VENT FOR AN ELECTROCHEMICAL CELL

FIELD OF THE INVENTION

The present invention relates to a device for relieving pressure within a container. More particularly, the invention relates to the use of a mechanism for releasing undesirable pressure from a galvanic or electrochemical cell. One class of galvanic or electrochemical cells to which the invention is particularly suited is a primary electrochemical cell which employs soluble or liquid cathode materials such as $Li/SOCl_2$, $Li/SO_2Cl_2$, $Li/SO_2$ or $Ca/SOCl_2$ systems.

BACKGROUND OF THE INVENTION

The cell systems in which there has been rapid commercial development have four major components, i.e., an anode (e.g., Li), an electrolyte (e.g., $SOCl_2$), an electrolyte salt (e.g., $LiAlCl_4$) and a cathode (e.g., carbon). The cathode serves as an electronically conductive and catalytic surface on which the electrolyte can be electro-reduced while the electrolyte or liquid cathode is $SOCl_2$ in which a salt, $LiAlCl_4$, is dissolved in order to make the solution conductive and to allow mass transport of $Li^+$ ions to the cathode. This lithium thionyl chloride cell has the highest energy density of commercially available primary cells. It has the desirable characteristics of good low and high temperature performance, excellent shelf life and a high power density in high rate designs. However, lithium has a melting point of 180.5° C. and, consequently, lithium cells should not be subjected to high temperature, short circuit, high rates of discharge or high rates of charge, in order to avoid melting the lithium. Molten lithium in contact with $SOCl_2$ creates a very hazardous and unstable condition and may initiate a cell explosion.

It has been shown that a vent is an effective means of preventing explosions or thermal runaways caused by shorting spirally wound $Li/SOCl_2$. Further, it has also been shown that a safe venting pressure of probably less than 200 PSI is required to avoid explosions and thermal runawys in $Li/SOCl_2$ cells. This low venting pressure results from the fact that $SOCl_2$ electrolytes have an intrinsically lower vapor pressure, see FIG. 1, as compared to commercially available $Li/SO_2$ cells. The electrolyte for a $Li/SO_2$ cell has a characteristically higher vapor pressure and therefore $Li/SO_2$ cells use vents which typically burst in the 450 PSI region.

A mechanical vent for an electrochemical cell with an electrolyte having a low vapor pressure should ideally exhibit the following criteria: low vent pressure, consistent vent pressure, relatively low cost, adaptable for mass production, occupy a small area and volume on the cell, no degradation of function with time and service, and significant expulsion of electrolyte from the cell. The simultaneous satisfaction of all these criteria is difficult to achieve in a vent. For example, prior art such as embossed and coined vents as disclosed in U.S. Pat. Nos. 4,105,133, 3,918,610 and 3,850,339 are not very effective for low pressure requirements and these vents also do not meet space and volume constraints. These vents, when applied to a $Li/SOCl_2$ cell, allow the cell to attain too high a temperature before venting and, therefore, thermal runaway occurs and an explosion results.

Vent designs with a simple flat diaphragm are known to have inconsistent bursting pressures, while improved devices which provide for a piercing point near the diaphragm, as in U.S. Pat. No. 4,307,158 also have inconsistent operation. This inconsistency is due to variations in diaphragm material flexure, sensitivity to the sharpness of the point, slowness of operation and blocking of the hole in the diaphragm by the point tip. Vents of the flat coined variety commonly known as "Boiler Vents" are expensive and do not meet the low cost criteria.

SUMMARY OF INVENTION

The invention described herein, is a device which when used on an electrochemical cell, will respond to the internal pressure of the electrolyte and, in particular, can be constructed to vent at pressures less than 200 PSI for use on $Li/SOCl_2$ cells. The vent expels gases and electrolyte and, thereby, controls hazards created by exposing a cell to high temperatures or to high rates of discharge. The vent satisfies the constraints of the aforementioned criteria. The invention is an improvement of the vent concept which uses a piercing point to rupture a diaphragm (U.S. Pat. No. 4,307,158). The piercing point is eliminated and instead an area of the diaphragm is affixed to the cell can by means of a spot weld. Force (pressure) concentrates on the spot weld area and the diaphragm materials rupture consistently. The problems of inconsistent activation and blockage of the hole by a point tip are thereby eleminated.

DETAILED DESCRIPTION OF THE INVENTION

Figure 1:
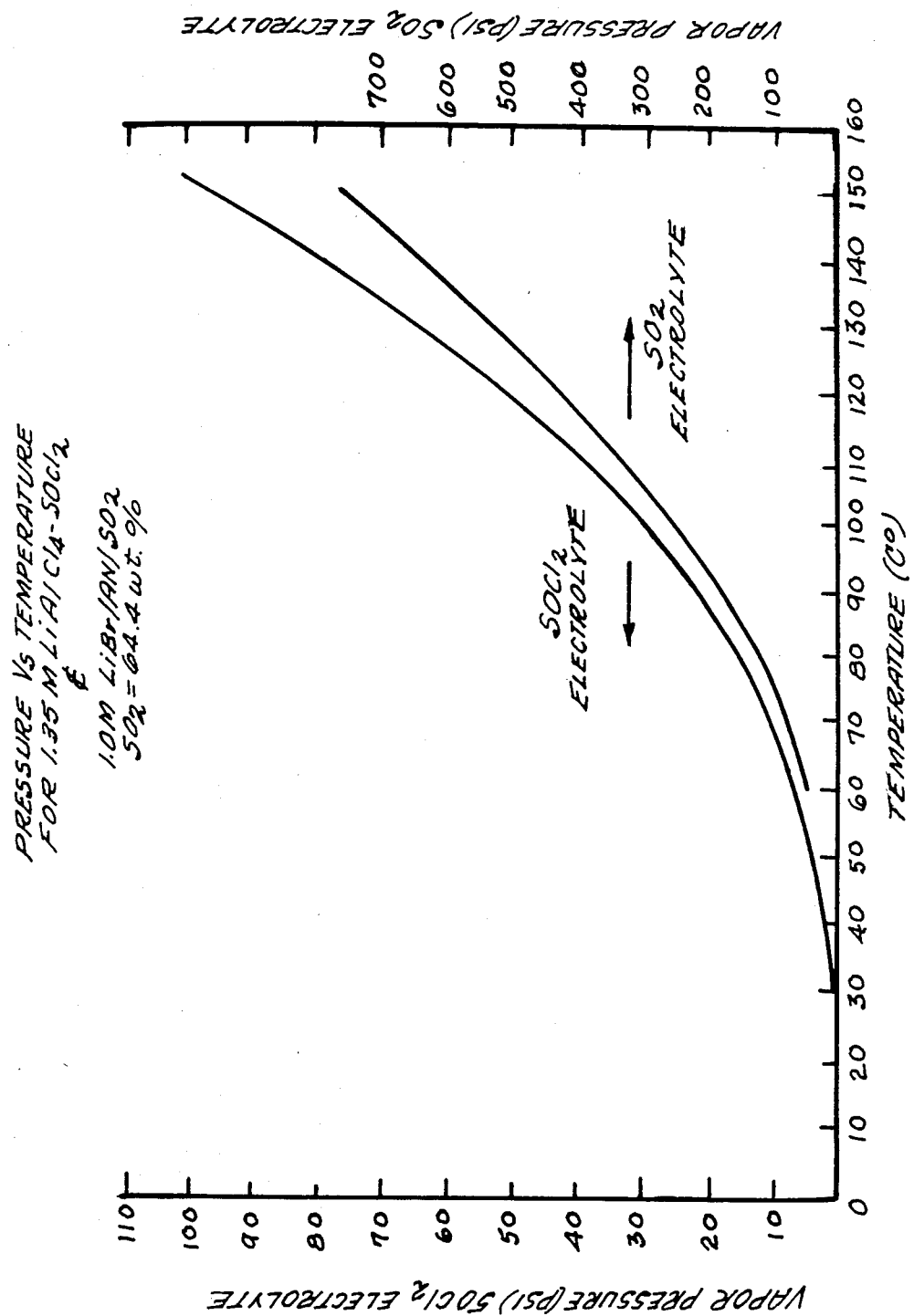
FIG. 1 shows temperature versus pressure for cells having $SOCl_2$ and $SO_2$ electrolytes.
Figure 2A:
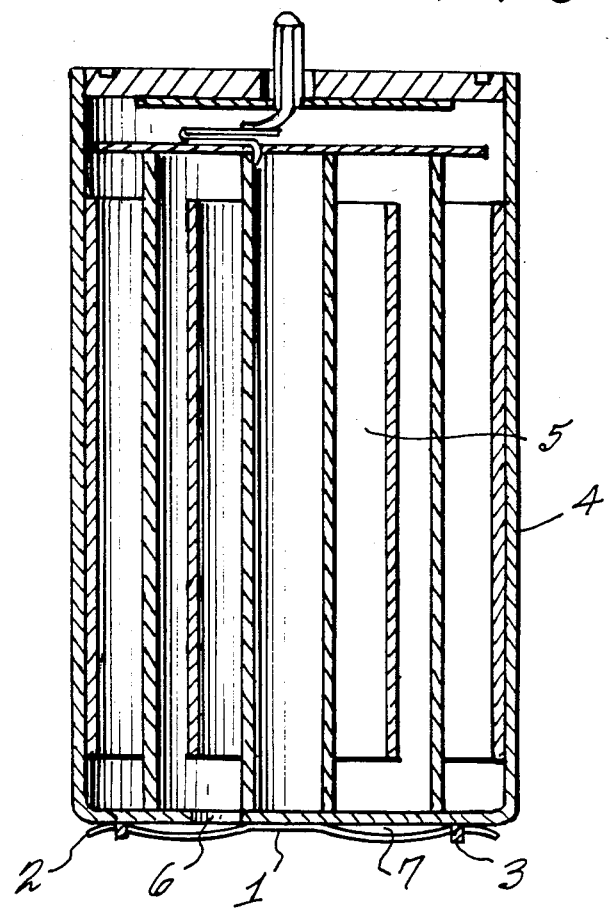
FIGS. 2A and 2B show respectively profile and plan views of the preferred embodiment of the invention.
Figure 2B:
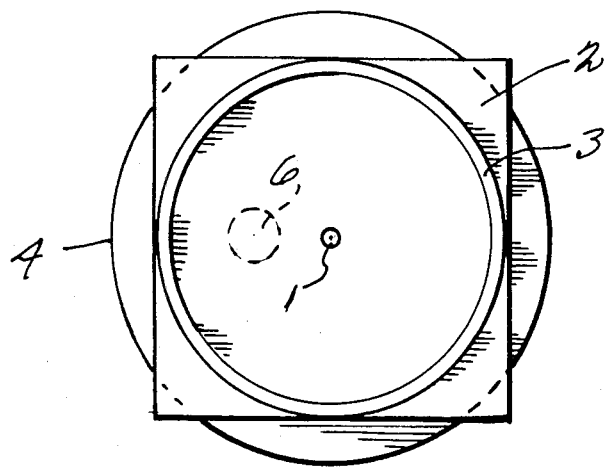

FIGS. 2A and 2B illustrates the preferred embodiment of the invention as it is applied for use on an electrochemical cell. In FIG. 2A, a spiral wound configuration is shown at reference numeral 5. The vent structure is attached to the bottom of a cylindrical cell (although, alternatively, the vent can also be attached to the top of the cell). The vent consists of thin metal diaphragm 2 attached to the can by means of projection welding ring 3. In this particular embodiment, a single spot 1 near the center of diaphragm 2 is welded to can wall 4. A circular hole 6, in can wall 4 allows electrolyte from the cell to pass into cavity 7 created between diaphragm 2 and can wall 4. Diaphragm 2 is now subject to the pressure dynamics of the internal cell via this opening. The spot weld acts to concentrate or focalize the stresses upon the diaphragm material to the spot weld locus. It is at this point, that diaphragm 2 ruptures when the pressure within the cells exceeds the mechanical strength of the vent. At the venting pressure, that part of the diaphragm welded to the can wall remains in place while the remainder of the diaphragm foil distorts or pulls away. A hole is therefore created in diaphragm 2 and pressure in the form of gas or liquid within the cell is relieved by ejection of gas or liquid through the hole.

In the preferred embodiment the following parameters are adjusted as a means of controlling the vent pressure: (1) the area of diaphragm material which is under pressure, (2) the thickness of the diaphragm, (3) the size and strength of the spot weld (which is controlled by welding conditions), and (4) the composition and temper of the diaphragm material. In an electrochemical cell there is an additional parameter used for control of the venting temperature, namely, the void volume (the volume of gasses in a completed cell or the volume not occupied by liquid or solid in the cell).

As will be obvious to those skilled in the art, there are other parameters affecting performance which must be controlled, but control of these parameters is not necessary to control the vent pressure.

Other embodiments can be imagined which would operate on a similar principle. The projection weld ring 3 shown in FIGS. 2A and 2B is used for convenience of manufacture. The diaphragm can also be attached along a continuous seam by at least three other techniques (different from the projection weld ring), i.e., laser beam welding, brazing and continuous seal welding.

The shape of the peripheral seam of the diaphragm could also be altered from the circular. The pressure induced stress in an ellipsoidal diaphragm, for example, would be distributed more unevenly than a seam that was round. It is expected that a change in the relative spot weld position would then alter the burst pressure to a greater extent than with a circular seam.

Figure 3:
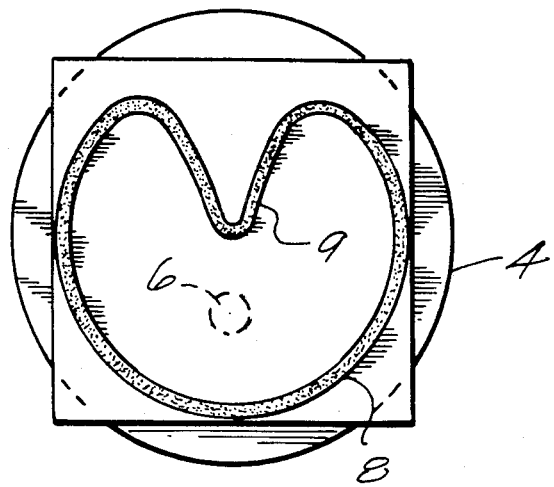
FIG. 3 shows a modification of the embodiment of the invention shown in FIGS. 2A and 2B.

The peripheral seam could also be made such that part of the seam protrudes into the interior as illustrated in FIG. 3. The resulting vent would function in a manner equivalent to the action in FIGS. 2A and 2B. In FIG. 3, the projection weld ring has been replaced by continuous seam weld 8. The seam comes to a point 9 in the center and this configuration would then operate similar to the device in FIG. 2.

EXAMPLE I

In a modification of the embodiment iof FIGS. 2A and 2B, vents were constructed on the cell header rather than the can bottom. The 0.001" annealed 302 stainless steel foil was projection welded to the header with a weld ring of 5/16" I.D. The spot weld nugget on the foil was approximately 0.020" in diameter and was applied near the center of circular diaphragm using an AC welder. The offset hole in the header beneath the diaphragm was 1/16" diameter. Out of 170 vents constructed, 21 vents were selected at random and were destructively tested to assess the burst pressure.

The test apparatus for burst pressure consisted of a fixture which held the header, an oil reservoir to which hydraulic pressure was applied and a Duro Instrument Corporation 0-300 PSI gauge. Typically, oil pressure was uniformly applied to the interior of the can and the bursting pressure of the vent was noted from the postion of the "follower needle" of the gauge. The 21 vents showed a mean bursting pressure of 186 PSI with a standard deviation of ±16 PSI. By comparison, the 0.001" annealed 302SS foil without a spot weld and similarly attached to the can with a 5/16" ID welding ring showed bursting pressures above 900 PSI.

EXAMPLE II

A group of cell cans, as configured in FIGS. 2A and 2B with a vent were tested for hermeticity and were shown to have a leak rate of less than $1 \times 10^{-8}$ cm$^3$/sec of helium as determined using a helium leak tester. The bursting pressure of the vents was ascertained to be 183 PSI before storage. These cells were then filled with 1.35M LiAlCl$_4$-SOCl$_2$ electrolyte and stored for 6 months at 65° C. The cells were cut open and repeatedly washed with SOCl$_2$ to remove any electrolyte salts. These cells were dried in an oven and then tested for hermeticity and bursting pressure.

The results indicated that hermeticity of the vent was not degraded by 6 months storage with SOCl$_2$ electrolyte at 65° C. and that the mean bursting pressure of these vents was the same as original pressure of 183 PSI.

EXAMPLE III

Figure 4:
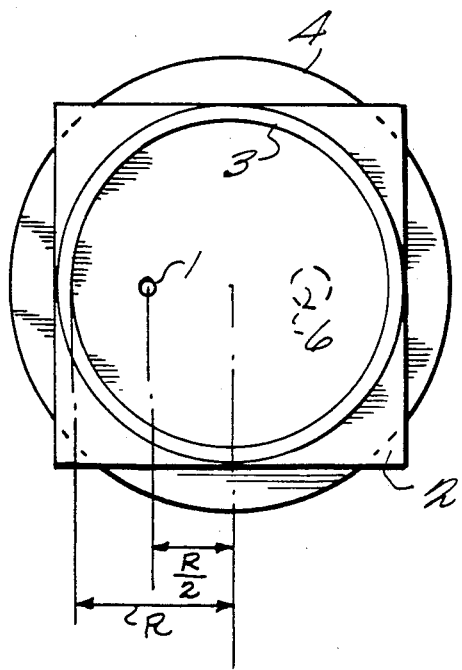
FIG. 4 shows another modification of the embodiment of the invention shown in FIGS. 2A and 2B.

The vent as originally configured in FIGS. 2A and 2B can also be constructed with the spot weld off center in order to increase the vent pressure. FIG. 4 shows the spot weld moved off center by one half the diaphragm radius. In one set of experiments with vents of this design, the average burst pressure of 30 cells was 153 PSI with a standard deviation of ±29 PSI. In the control group of 25 cells with the spot weld situated near the center of the diaphragm, the average burst pressure was 101 PSI with a standard deviation of ±39 PSI. Thus, moving the spot weld alters the relative distribution of restraining forces between the spot and the peripheral weld.

EXAMPLE IV

Figure 5:
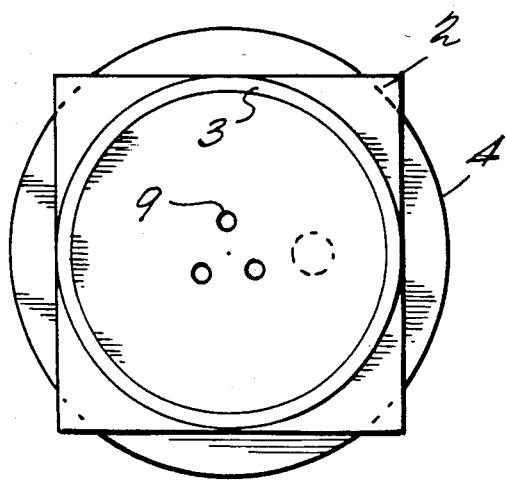
FIG. 5 shows an embodiment of the invention using multiple spot welds.

In another embodiment, the vent can be constructed with multiple spot welds. All other things being equal if the number of spot welds is increased, the stress on each will be decreased at a given pressure. The spot welds support each other and thereby the burst pressure is increased. FIG. 5 shows three spot welds grouped around the center of the vent. In an experiment, with 304SS foil under fixed welding conditions and the welding ring per Example 1, a single spot weld vent operated at 76 PSI with a standard deviation of ±12 PSI from a sample size of 8. In contrast, the same diaphragm with 3 spot welds showed a burst pressure of 192 PSI with a standard deviation of ±22 PSI from a sample size of 20.

EXAMPLE V

The impact of void volume of the cell on the bursting temperature of the cell was investigated in this example, using ⅔ A Li/SOCl$_2$ cells. The cells were constructed as follows: A vent of the preferred embodiment as described in Example I (Bursting pressure of 183 PSI±30 PSI) was constructed on the bottom of a cylindrical ⅔A can of diameter 0.63" (16 mm) and height 1.34" (34 mm). Spirally wound electrode configurations using glass separators of 0.007" thickness were built into the cells (Li anode=¾"×3"×0.024") and (carbon cathode=¾"×3"×0.040"). The resulting assembly then had a top header (with a hollow tube glass to metal seal) tig welded to the case. The total void volume (internal volume not occupied by solid components, e.g. carbon, Li, etc.) of the ⅔ cells was then ascertained by backfilling the cells in vacuum through the hollow metal feed-through with a silicon oil of known density. These cells had an average total void volume of 3.35 cm³.

Figure 6:
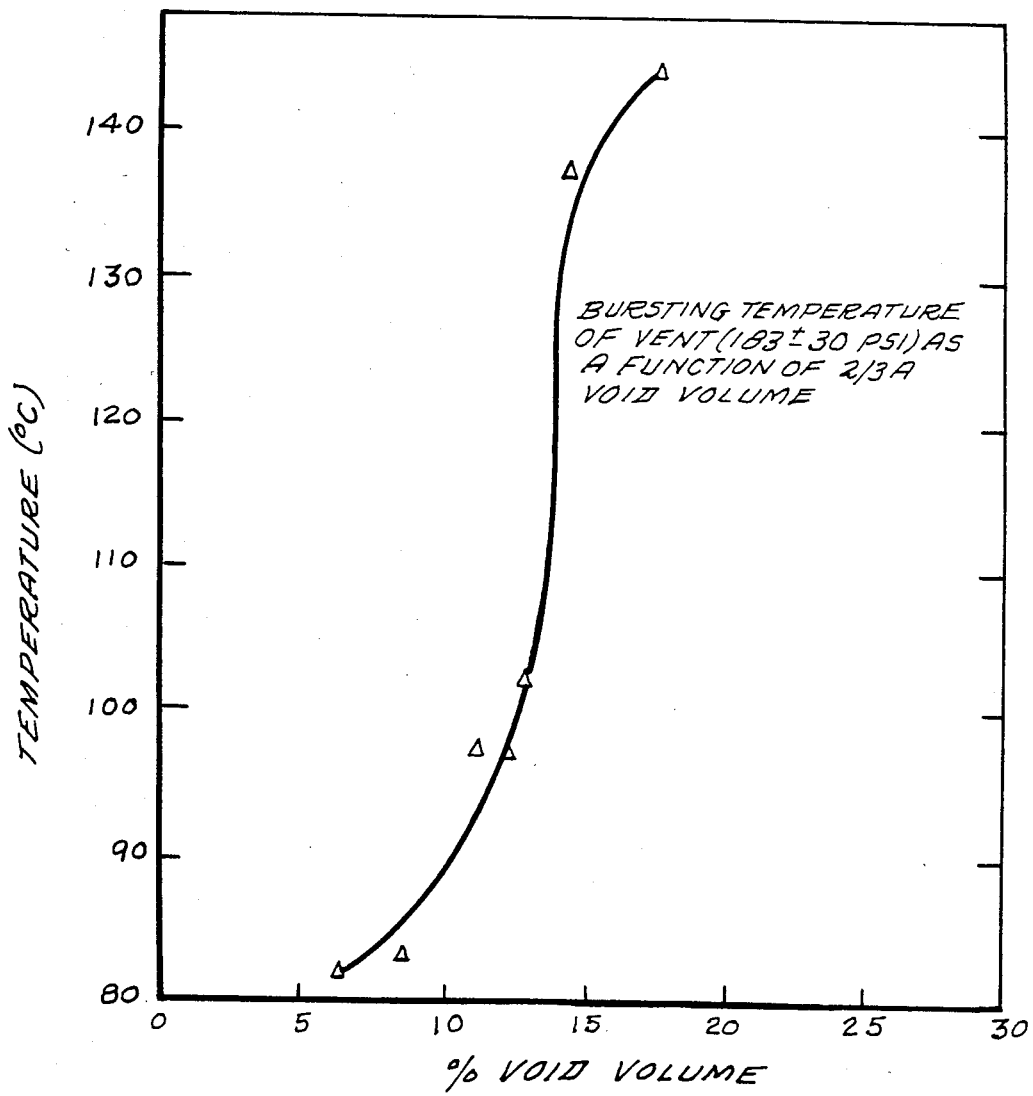
FIG. 6 graphically depicts the impact of void volume of the cell on the bursting temperature of the cell.

In separate experiments, cells were then filled with 1.35M LiAlCl$_4$-SOCl$_2$ electrolyte to effect void volumes between 6-18% (void volume is defined as the total volume minus the SOCl$_2$ electrolyte volume) and the hollow feed-throughs in these cells were welded closed. The resulting ⅔ A Li/SOCl$_2$ cells with the vent in place were assessed for their temperature of venting as a function of void volume in the cell (see FIG. 6). It can be seen that as the void volume increased (with a constant bursting pressure of 183 PSI±30 PSI) the temperature of the vent bursting also increased. This is an important observation of a synergistic effect between the void volume and bursting pressure determining at what temperature the vent will burst.

EXAMPLE VI

Spirally wound Li/SOCl$_2$ D cells were constructed with vents similar to the embodiment of Example I, except that the vents were placed in the top header of the cell assembly. The vents for these particular tests had a range of burst pressures between 150-200 PSI.

Figure 7:
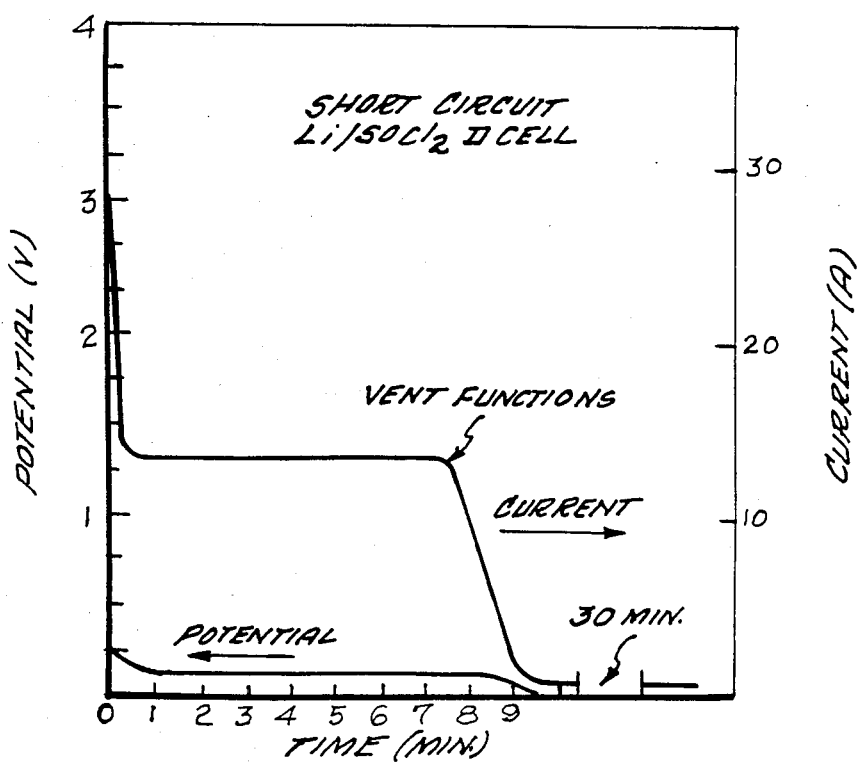
FIG. 7 graphically shows the results of short circuit tests conducted on cells built in accordance with the invention.

The Li/SOCl$_2$ D cells were then short-circuited through an external circuit of 0.04 ohm resistance. The instantaneous peak current near 30 A rapidly decreased to about 13 A. (see FIG. 7). The cell vented after 7.5 minutes and the current and voltage decreased at this point. The short circuit was continued for over 30 minutes with a voltage near zero and a current of less than 0.2 A.

At this point the experiment was terminated and the cells were inspected. The results indicated that 50% of the electrolyte weight was expelled through the vent. The cells did not bulge, deform or exhibit unsafe behavior and the vent functioned as intended to eject electrolyte and, thereby, the current and temperature rise of the cell were limited.

EXAMPLE VII

Figure 8:
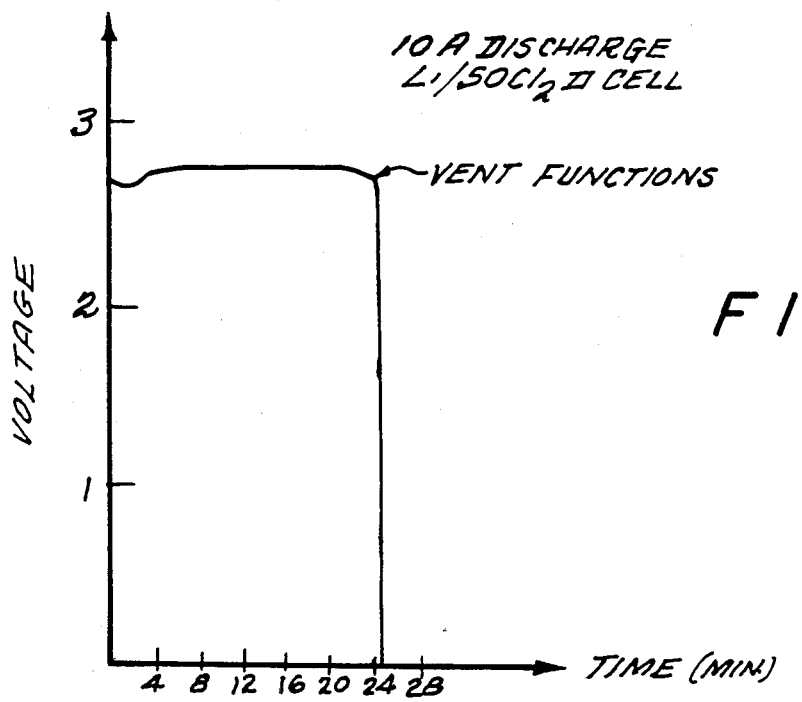
FIG. 8 graphically shows the results of high rate current discharge tests conducted on cells built in accordance with the invention.

A Li/SOCl$_2$ D cell was constructed the same as described in Example VI. This 11 A hr. capacity (at 2 A rate) cell was discharged at 10 A constant current which is considered a high rate for a D cell. This 10 A discharge simulates a typical abusive test that a Li/SOCl$_2$ cell must sustain without hazardous action such as explosion or detonation. The 10 A discharge contributes IR heating to the cell which could result in a runaway thermal reaction. FIG. 8 indicates the voltage-time profile for this cell. The vent acted quickly after 24 minutes to eject electrolyte and shut down the cell discharge without incident.

Although the invention has been described with respect to specific embodiments and examples, it should be obvious that there are numerous variations within the scope of the present invention. Thus, the present invention is intended to cover not only the described embodiment, but also those variations falling within the scope of the appended claims.

We claim:

1. A pressure relief vent for use with a container subjected to internal pressure by a fluid, said vent comprising:
   pressure relief means comprising a diaphragm essentially flat in shape fastened to the exterior of the container at the perimeter of said diaphragm and at a location within the perimeter of said diaphragm; and
   an opening in the container disposed so that fluid from the container can pass between said diaphragm and the container and exert pressure on said diaphragm;
   said pressure relief means being ruptured at a predetermined pressure exerted by the fluid on said diaphragm.

2. A vent as in claim 1 wherein the perimeter of said pressure relief means is fastened to the container by welding.

3. A vent as in claim 2, wherein the welding seam fastening the perimeter of said pressure relief means to the container is round.

4. A vent as in claim 2, wherein the welding seam fastening the perimeter of said pressure relief means to the container is elliptical.

5. A vent as in claim 1 wherein the perimeter of said pressure relief means is fastened to the container by brazing.

6. A vent as in claim 1, wherein said diaphragm is fastened to the exterior of the container at at least one additional location within the perimeter of said diaphragm.

7. A pressure relief vent for use with a container subjected to internal pressure by a fluid, said vent comprising:
   pressure relief means comprising a diaphragm essentially flat in shape fastened to the exterior of the container by welding at a locus of points comprising a heart shaped weld seam with at least one edge of said weld seam being substantially located within the perimeter of said diaphragm and at least one other edge of said weld seam being substantially located at the perimeter of said diaphragm; and
   an opening in the container disposed so that fluid from the container can pass between said diaphragm and the container and exert pressure on said diaphragm;
   said pressure relief means being ruptured at a predetermined pressure exerted by the fluid on said diaphragm.

8. A method of forming a pressure relief vent in a container subjected to internal pressure by a fluid, said method comprising the steps of:
   providing an opening in the container;
   covering the opening with a flat diaphragm; and
   fastening the diaphragm, at its perimeter and at a spot location within its perimeter, to the container so that at a predetermined pressure the spot location fastening causes a stress concentration which allows the diaphragm to rupture.

9. A method as in claim 8 wherein the position of the spot location fastening is selected to determine the predetermined pressure at which the diaphragm ruptures.

10. A method as in claim 8 wherein said fastening step is carried out by welding.

11. A. method as in claim 8 wherein said fastening step is carried out by brazing.

12. A method as in claim 8 wherein the size of the spot location fastening is selected to determine the burst pressure and the rate of fluid escape from the container after the diaphragm ruptures.

13. A method as in claim 8 wherein material composition and temper of the diaphragm are selected to stabilize and determine the predetermined pressure at which the diaphragm ruptures.

14. A method as in claim 8 wherein the thickness of the diaphragm is selected to determine the predetermined pressure at which the diaphragm ruptures.

* * * * *